United States Patent
Gonzaga et al.

(10) Patent No.: US 11,254,174 B2
(45) Date of Patent: Feb. 22, 2022

(54) MACHINE FOR MOUNTING AND/OR REMOVING VEHICLE WHEELS, IN PARTICULAR TRUCK WHEELS

(71) Applicant: Butler Engineering and Marketing S.p.A., Rolo (IT)

(72) Inventors: Tullio Gonzaga, Correggio (IT); Daniele Pancaldi, Rolo (IT)

(73) Assignee: BUTLER ENGINEERING AND MARKETING S.P.A., Rolo (IT)

( * ) Notice: Subject to any disclaimer, the term of this patent is extended or adjusted under 35 U.S.C. 154(b) by 328 days.

(21) Appl. No.: 16/598,251

(22) Filed: Oct. 10, 2019

(65) Prior Publication Data

US 2020/0114708 A1    Apr. 16, 2020

(30) Foreign Application Priority Data

Oct. 10, 2018    (IT) ........................ 102018000009322

(51) Int. Cl.
  *B60C 25/138*    (2006.01)
(52) U.S. Cl.
  CPC .................................. *B60C 25/138* (2013.01)
(58) Field of Classification Search
  CPC ............ B60C 25/0518; B60C 25/0521; B60C 25/0545; B60C 25/138
  See application file for complete search history.

(56) References Cited

U.S. PATENT DOCUMENTS

| | | | |
|---|---|---|---|
| 5,060,708 A | 10/1991 | Hansen | |
| 5,649,582 A | 7/1997 | Hjorth-Hansen | |
| 6,422,285 B1 | 7/2002 | Gonzaga | |
| 9,434,219 B1 * | 9/2016 | Clasquin | B60C 25/0548 |
| 9,662,946 B2 * | 5/2017 | Corghi | B60C 25/138 |
| 9,731,566 B1 * | 8/2017 | Voeller | B60C 25/138 |
| 9,802,448 B2 * | 10/2017 | Zhang | B60C 25/13 |
| 9,834,046 B2 * | 12/2017 | Nicolini | B60C 25/0548 |
| 9,902,221 B2 * | 2/2018 | Corghi | B60C 25/059 |
| 10,173,482 B2 * | 1/2019 | Magnani | B60C 25/138 |
| 10,377,193 B2 * | 8/2019 | Gonzaga | B60C 25/138 |
| 10,661,619 B2 * | 5/2020 | Bonacini | B60C 25/0554 |
| 10,906,364 B2 * | 2/2021 | Gonzaga | B60C 25/056 |
| 2011/0042875 A1 | 2/2011 | Story | |
| 2016/0288598 A1 * | 10/2016 | Bonacini | B60C 25/138 |
| 2018/0126807 A1 * | 5/2018 | Corghi | B60C 25/138 |

(Continued)

FOREIGN PATENT DOCUMENTS

| | | |
|---|---|---|
| CN | 105799433 | 7/2016 |
| EP | 1040941 | 10/2000 |
| EP | 1364814 | 11/2003 |

(Continued)

OTHER PUBLICATIONS

Office Action for European Application No. EP19201650.9 dated Oct. 23, 2020 (7 pages).

(Continued)

*Primary Examiner* — David B. Thomas

(74) *Attorney, Agent, or Firm* — Tutunjian & Bitetto, P.C.

(57) ABSTRACT

The present invention regards a machine for mounting and/or removing tyred wheels for vehicles including a framework, means for driving a wheel in rotation, a first arm extending or supported by the framework and a first mounting and/or removal tool supported by the first arm.

18 Claims, 13 Drawing Sheets

(56) References Cited

U.S. PATENT DOCUMENTS

2018/0304704 A1* 10/2018 Corghi .................. B60C 25/138

FOREIGN PATENT DOCUMENTS

| | | |
|---|---|---|
| EP | 1584496 | 10/2005 |
| EP | 1607247 | 12/2005 |
| EP | 1946946 | 7/2008 |
| EP | 2113403 | 11/2009 |
| EP | 2468541 A1 | 6/2012 |
| EP | 3323644 | 5/2018 |
| JP | 2010285059 | 12/2010 |
| WO | 2009015920 | 2/2009 |
| WO | 2009130135 | 10/2009 |
| WO | 2014037771 | 3/2014 |
| WO | 2014184645 | 11/2014 |

OTHER PUBLICATIONS

Italian Search Report for Italian Application No. 102018000009322 dated May 16, 2019 (9 pages).
Search Report for International Application No. PCT/IB2014/000744 dated Aug. 19, 2014 (2 pages).
Search Report for European Application No. EP17199669 dated Mar. 23, 2018 (3 pages).
Search Report for International Application No. PCT/IB2013/001678 dated Nov. 13, 2013 (2 pages).
Search Report for European Application No. EP03011044 dated Dec. 9, 2003 (2 pages).

* cited by examiner

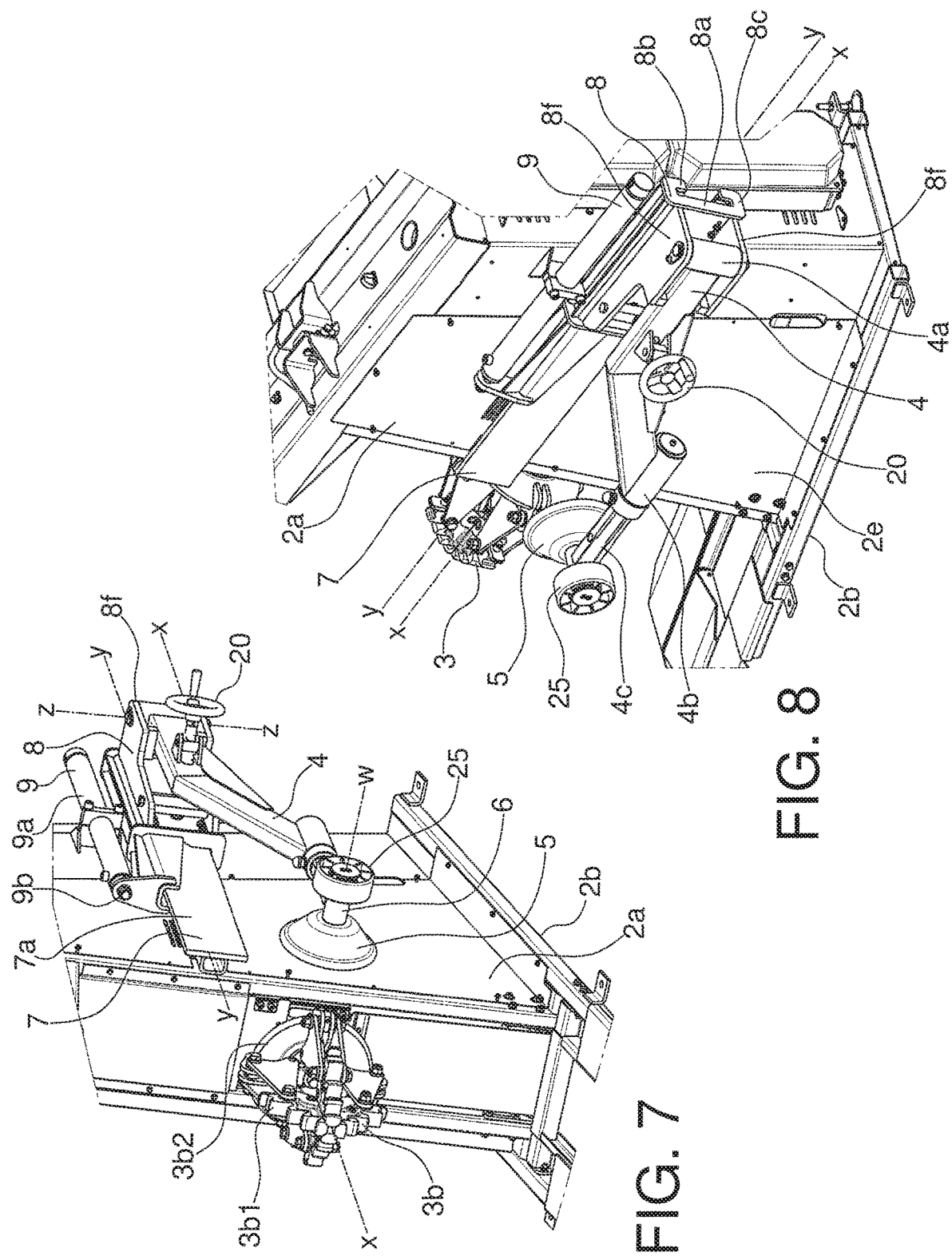

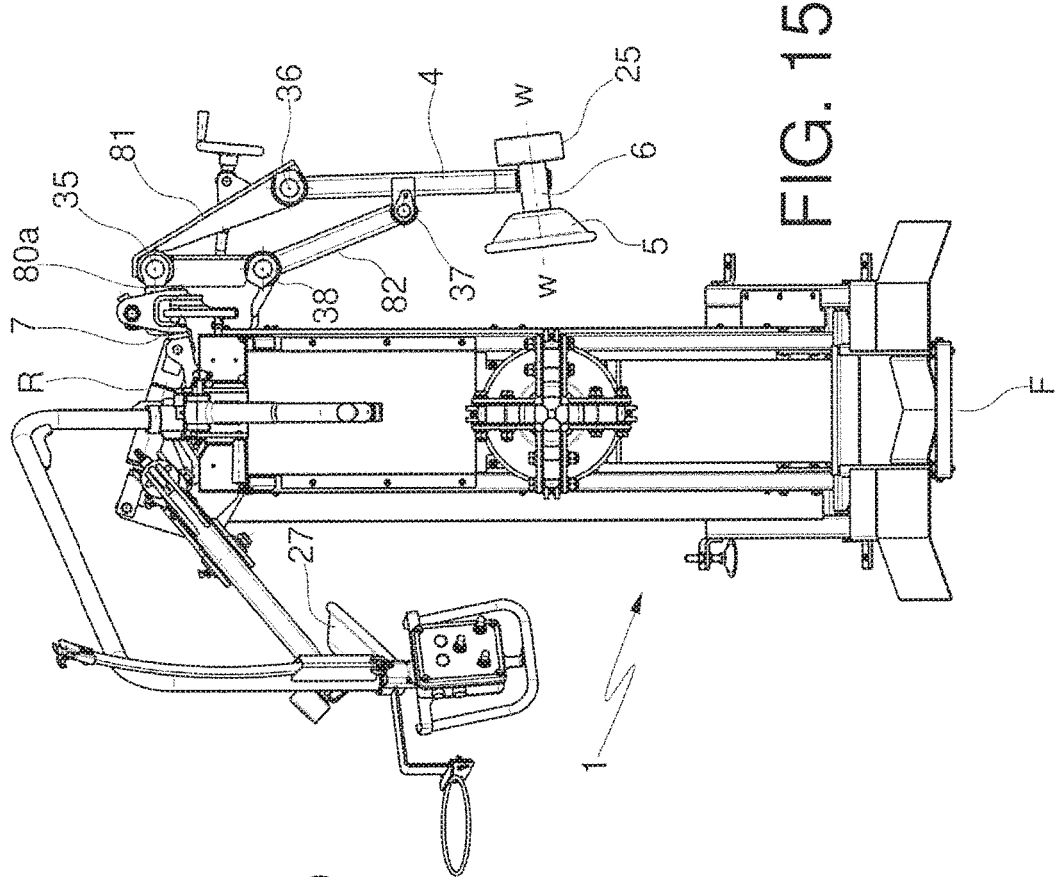
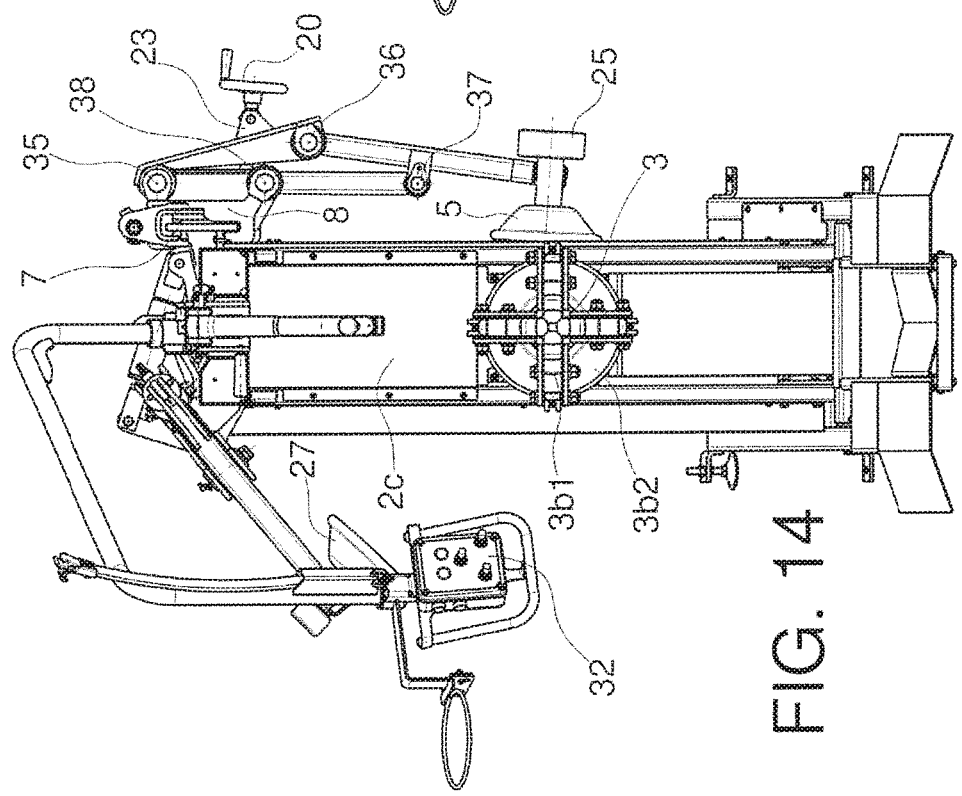

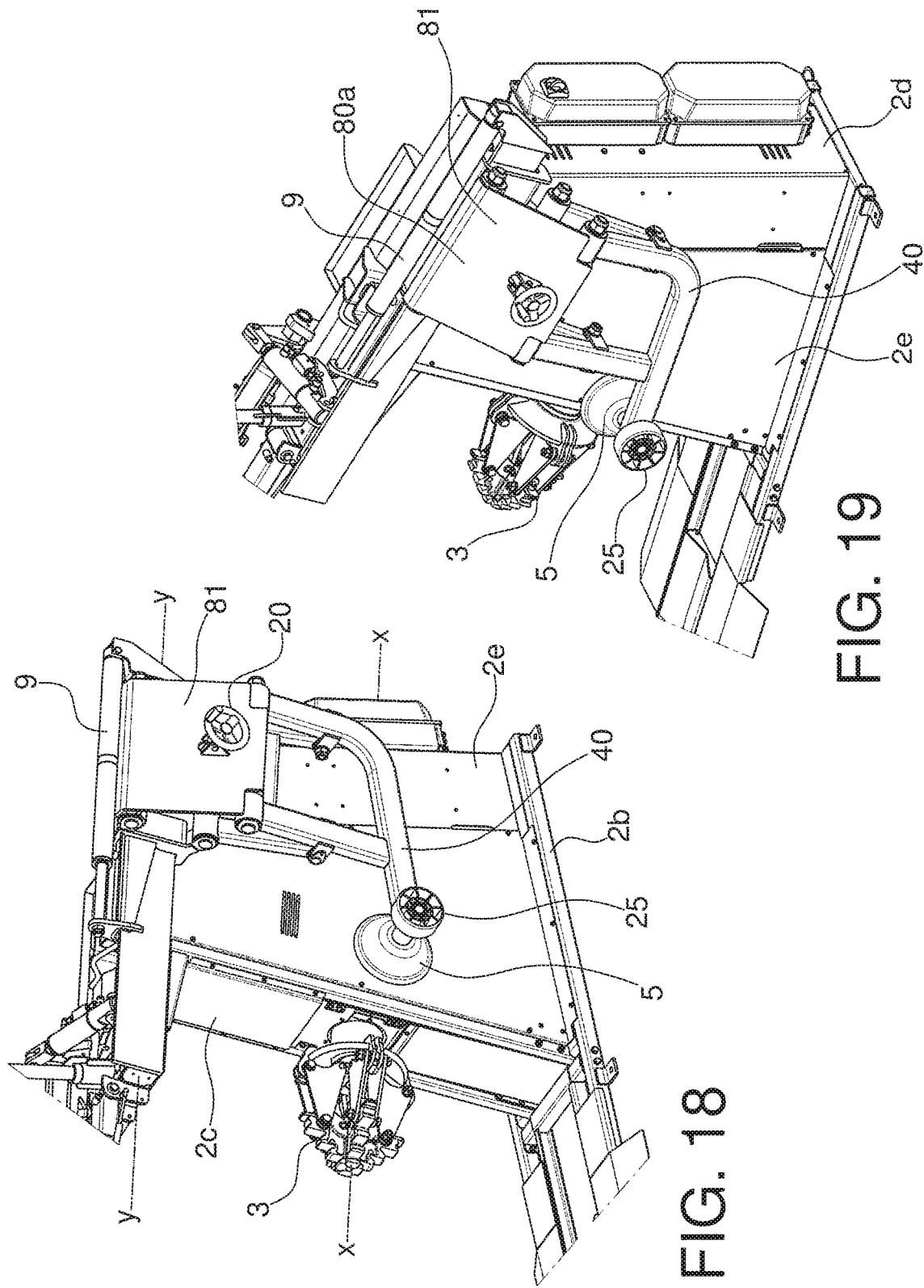

US 11,254,174 B2

MACHINE FOR MOUNTING AND/OR REMOVING VEHICLE WHEELS, IN PARTICULAR TRUCK WHEELS

TECHNICAL FIELD OF THE INVENTION

The present invention regards a machine for mounting and/or removing tyred wheels, in particular truck wheels, as well as a method for removing wheels.

DESCRIPTION OF RELATED ART

Machines having a pair of arms bearing respective tools designated for engaging each a respective side of the machine are usually used for mounting or removing truck wheels, the tools being suitably driven by means of special actuators.

U.S. Pat. No. 6,422,285B1 for example discloses a machine including a rear arm supporting a rear roller designated to engage a first rear side, in use, of a wheel or better a first circumferential bead of a respective tyre in the direction from the rear to the front of the machine and a front arm for supporting a front roller designated to engage the second front side, in use, of a wheel or better a second circumferential bead of a respective tyre in the direction from the front to the rear of the machine.

Both the front arm and the rear arm are pivoted to a column of the machine around a substantially horizontal axis to carry out operations for engaging a respective bead of a tyre.

The two arms are then also displaceable so as to adapt the rollers to handle wheels of different diameter.

As concerns this, in particular regarding the rear roller, it engages the first circumferential bead along a substantially circle arc-like trajectory.

It was observed that such working trajectory determines considerable and damaging stresses on the rear arm, with ensuing damaging of the same.

Furthermore, such solution does not even guarantee a correct handling of the wheel or better of the tyre.

Furthermore, the movement provided for the rear arm for adapting the rear roller to handle wheels of different diameter determines a further deterioration of the operative conditions of such arm, at least with reference to most wheels to be handled.

WO2014184645A1, US2011042875A1, EP3323644A1, WO2014037771A1 and EP1364814A2 disclose solutions according to the prior art.

SUMMARY OF THE INVENTION

An object of the present invention is to provide a new machine for mounting and/or removing vehicle wheels, in particular truck wheels.

Another object of the present invention is to provide a mounting and/or removal machine that is structured so as not to generate high or erroneous reaction forces by the wheel or high or erroneous stress forces of the working arms, in particular a rear arm.

Another object of the present invention is to provide a mounting and/or removal machine that is capable of correctly handling a tyred wheel.

Another object of the present invention is to provide a mounting and/or removal machine that can be used correctly and without determining the occurrence of high stress forces for a rear arm irrespective of the size of the wheel to be handled.

According to an aspect of invention, a machine according to the present application is provided for.

The present application refers to preferred and advantageous embodiments of the invention.

BRIEF DESCRIPTION OF THE DRAWINGS

Other characteristics and advantages of the invention will be more apparent from the description of embodiments of a machine, illustrated by way of example in the drawings wherein:

FIGS. 7 and 8 are perspective views of parts of the machine of FIG. 1;

FIGS. 14 and 15 are front views of the machine of FIG. 10 in respective operative trims;

FIGS. 18 and 19 are perspective views of parts of the machine of FIG. 10; and

In the attached drawings, identical parts or components are distinguished using the same reference numbers.

DETAILED DESCRIPTION OF THE INVENTION

Figure 1:
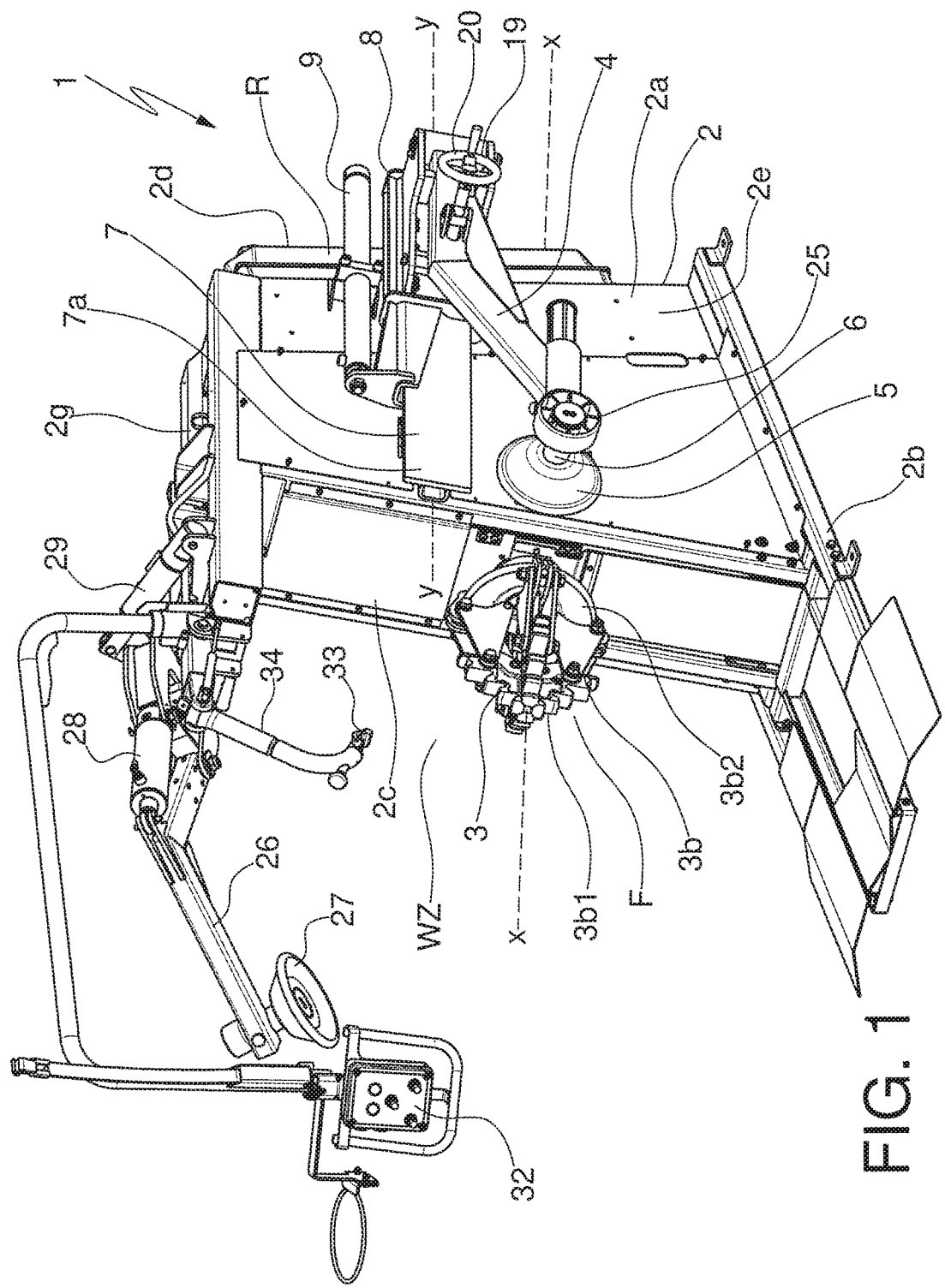
FIGS. 1 and 2 are perspective views, slightly from the top and from respective sides, of an embodiment of a machine according to the present invention.
Figure 2:
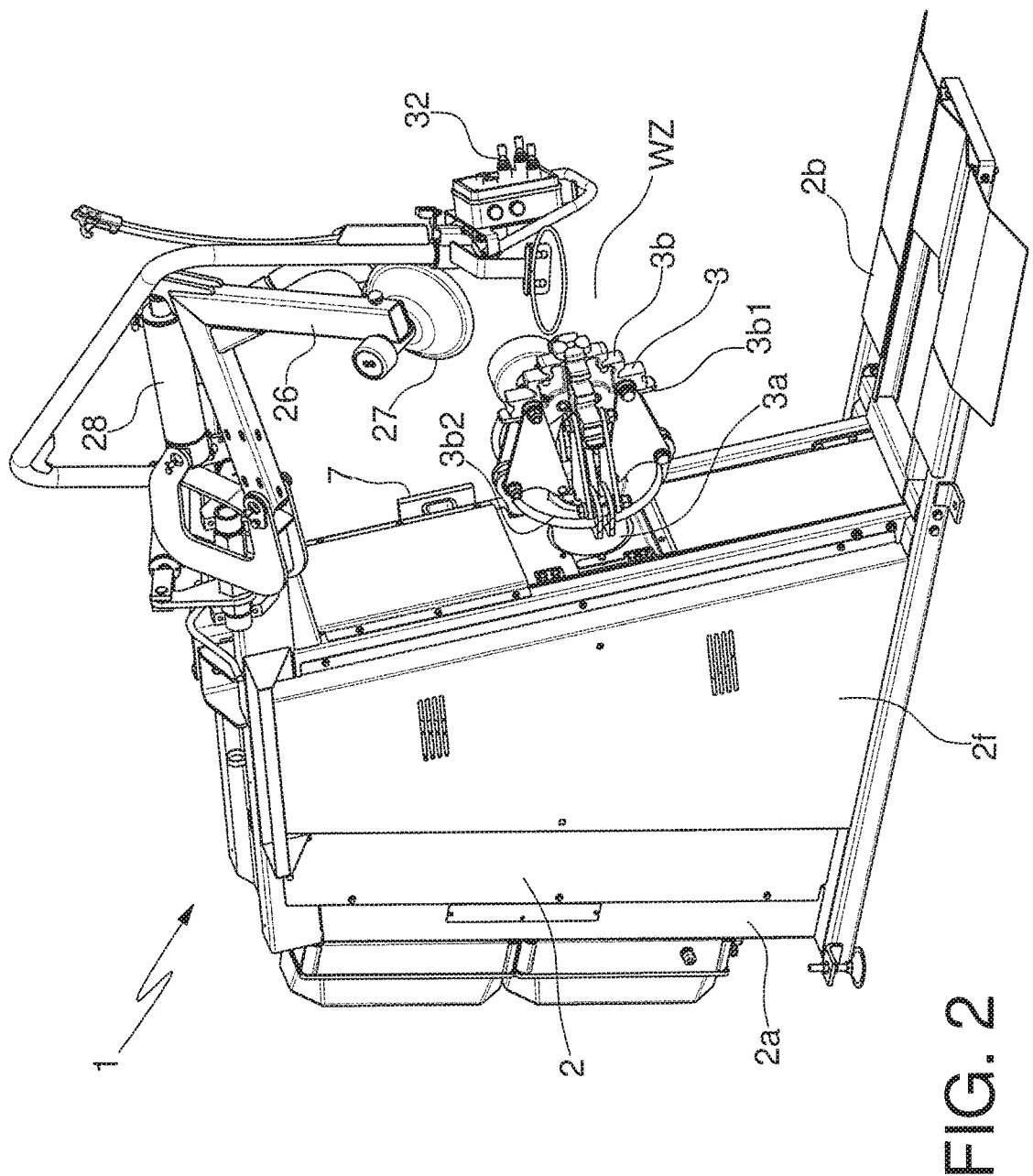
Figure 3:
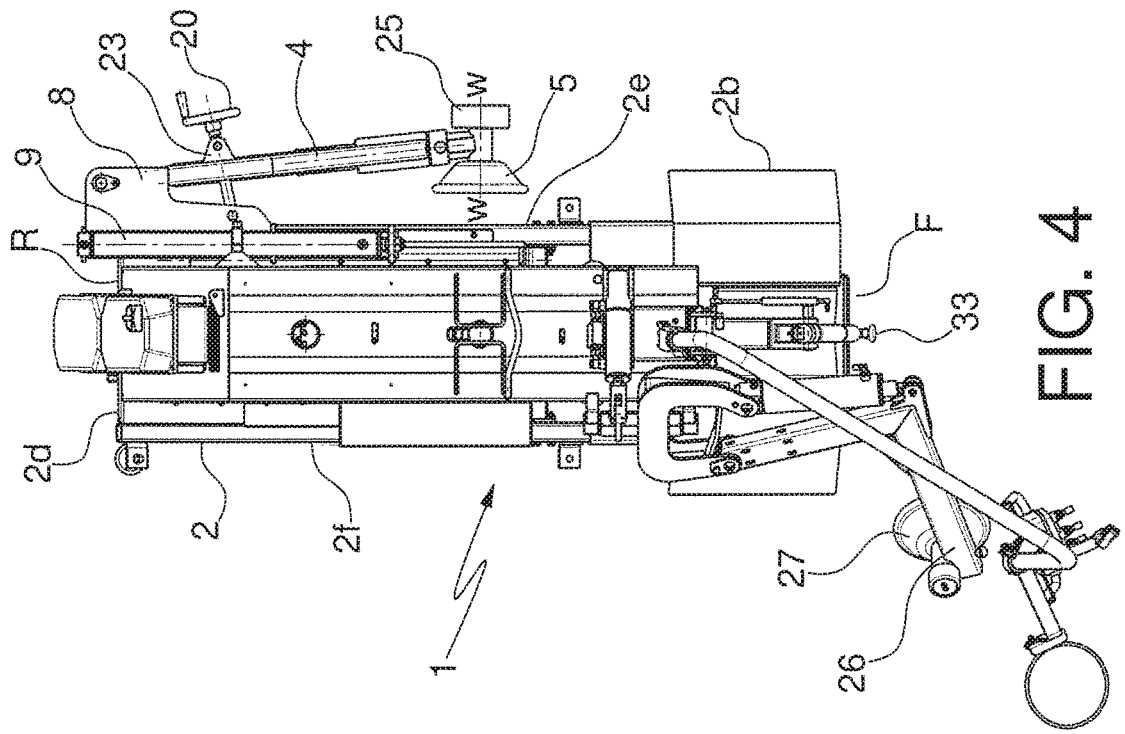
FIGS. 3 and 4 are top views of the machine of FIG. 1 in respective operative configurations.
Figure 4:
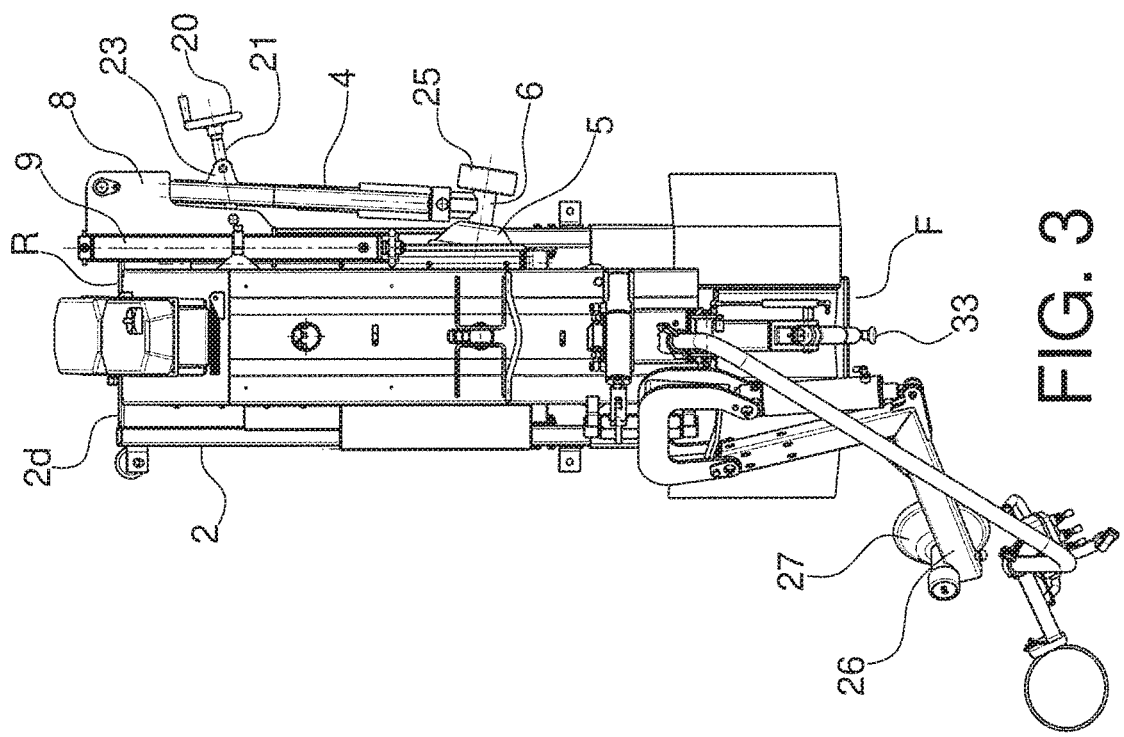
Figure 6:
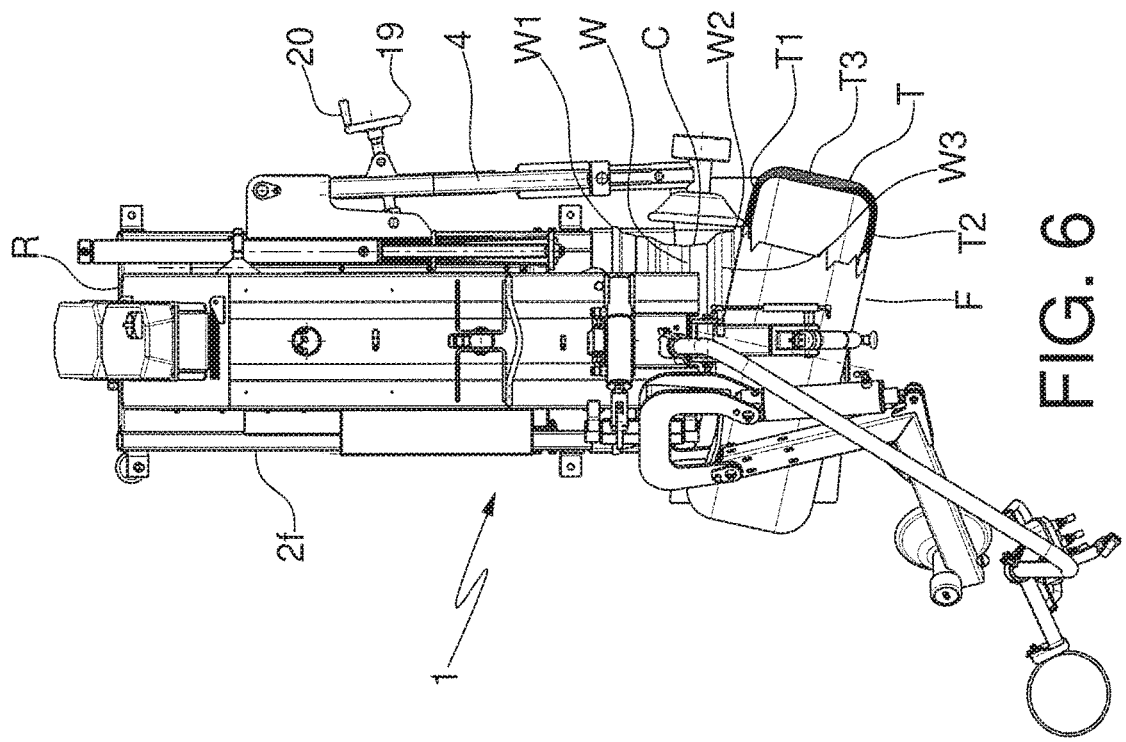
FIGS. 5 and 6 are top views of the machine of FIG. 1 in respective removal steps.
Figure 5:
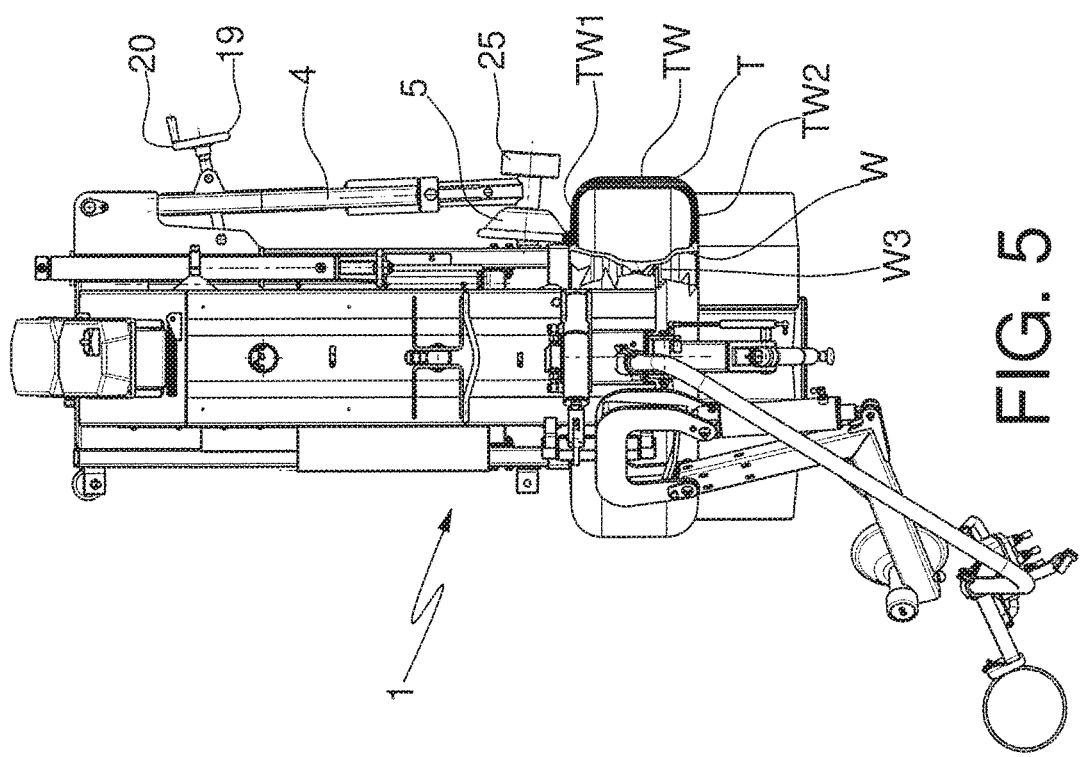
Figure 9:
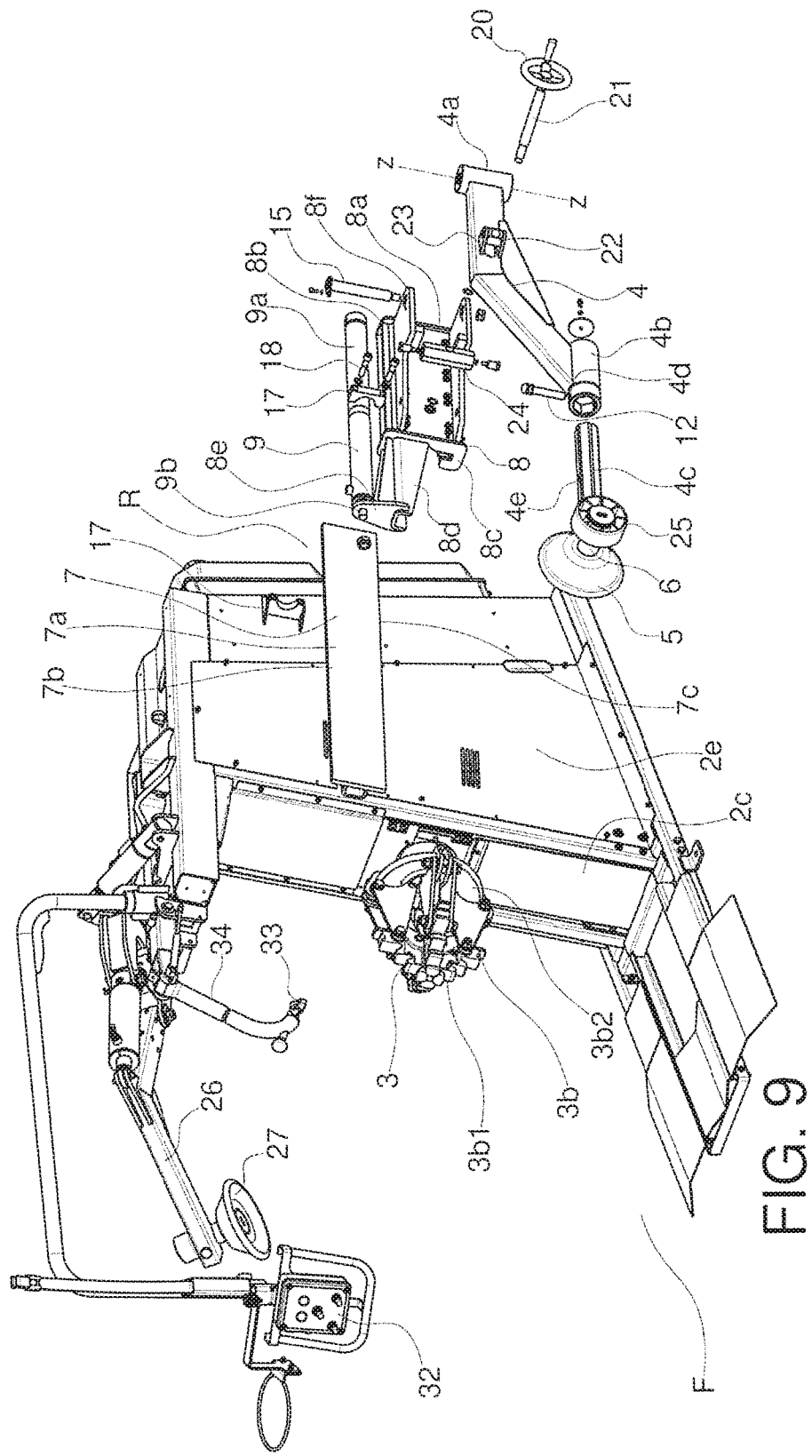
FIG. 9 is a view with parts of the machine of FIG. 1 in exploded view.
Figure 10:
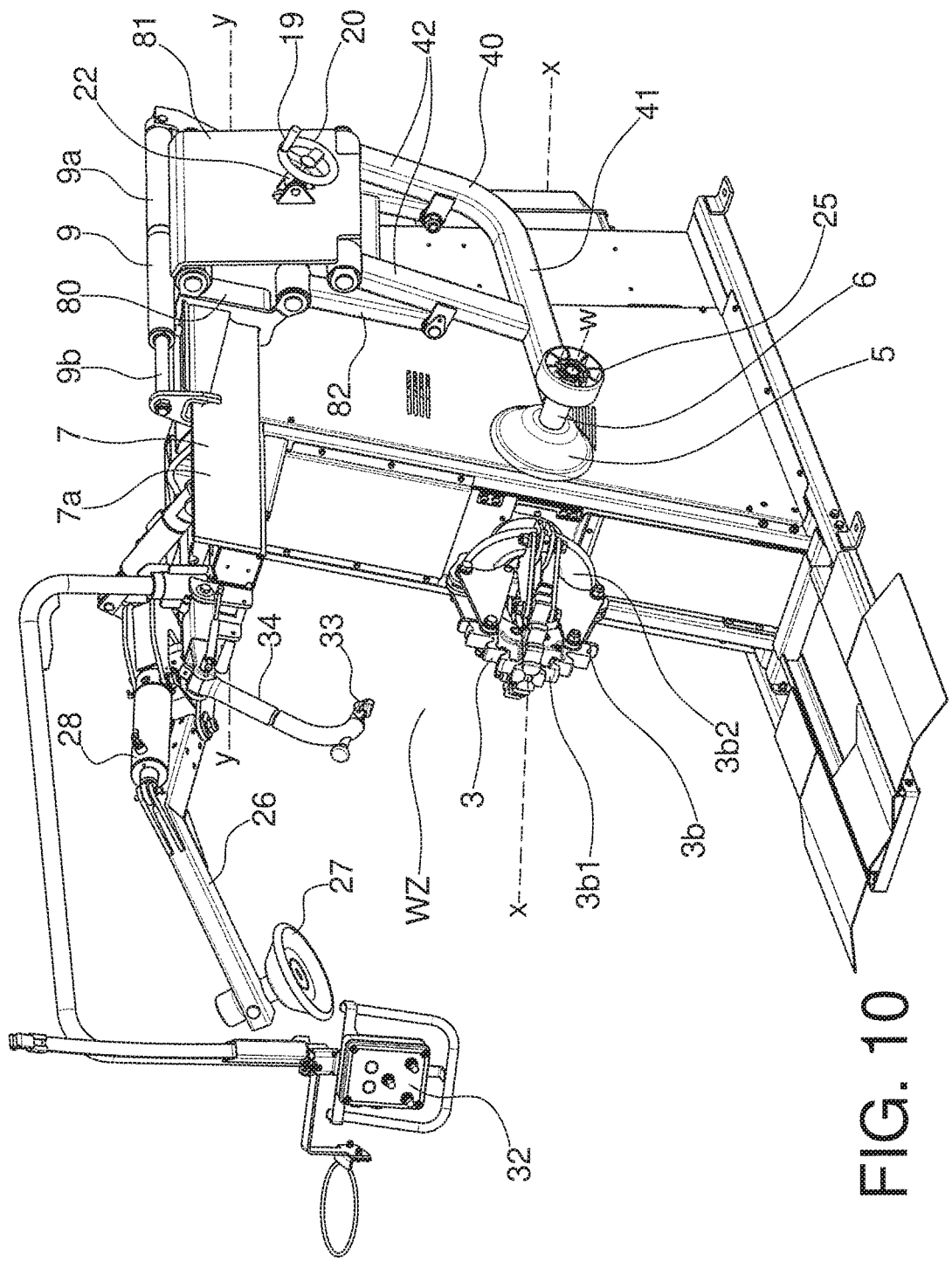
FIGS. 10 and 11 are perspective views, slightly from the top and from respective sides, of another embodiment of a machine according to the present invention.
Figure 11:
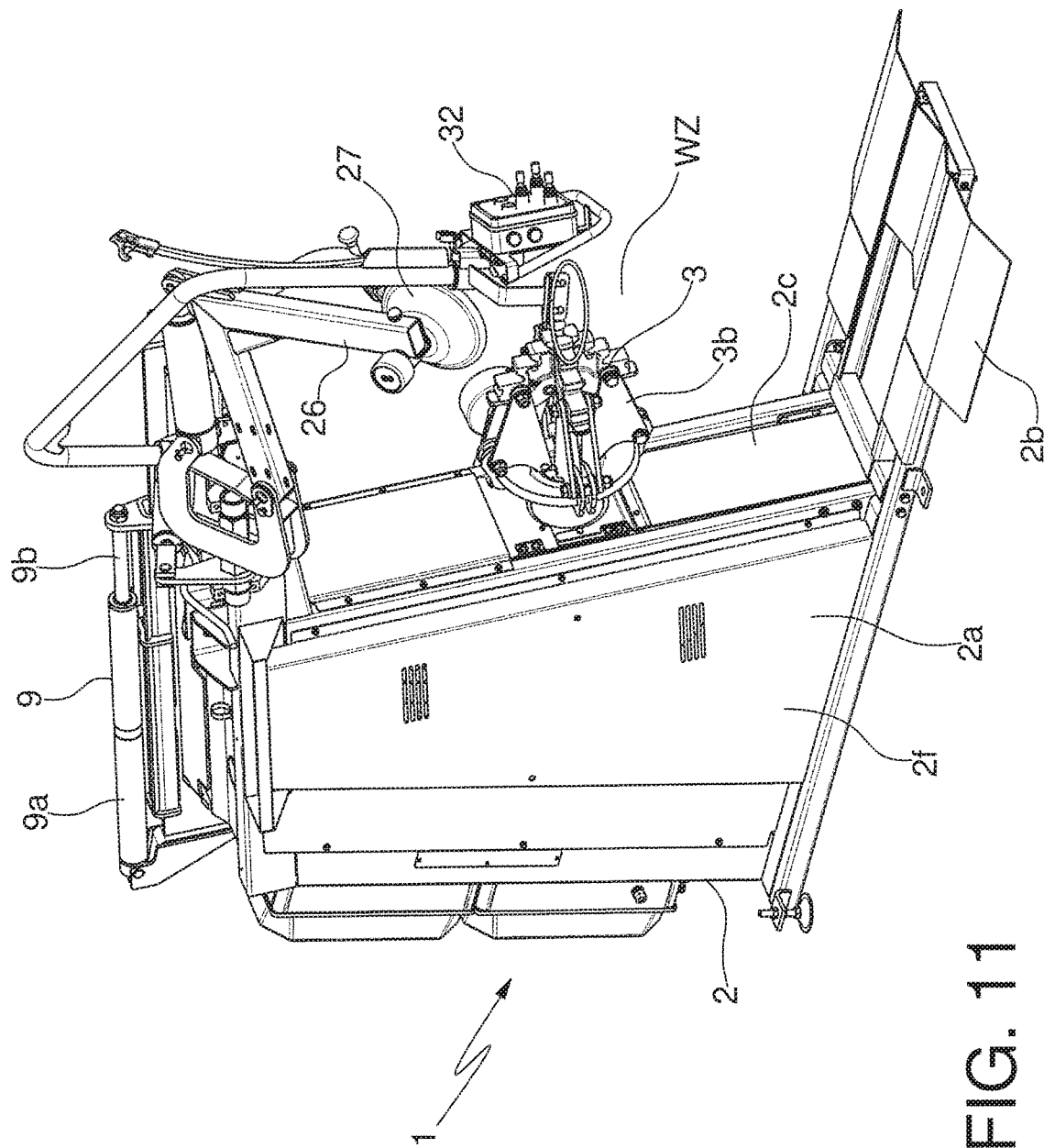
Figure 12:
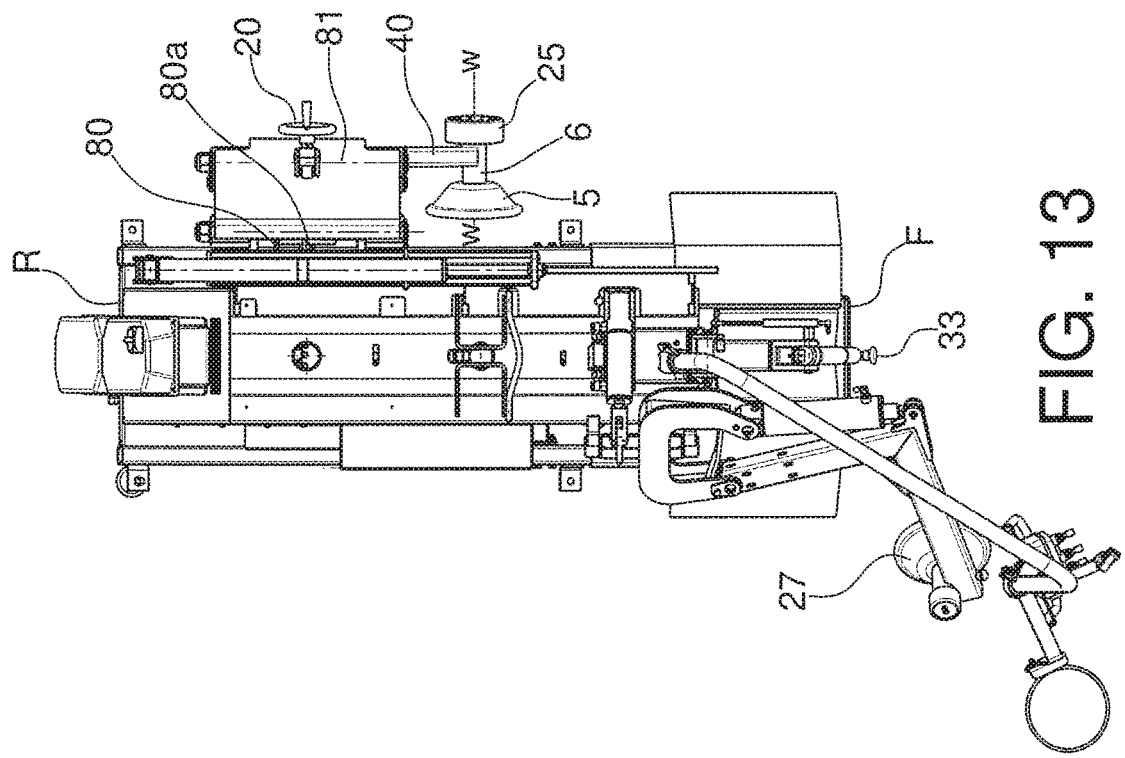
FIGS. 12 and 13 are top views of the machine of FIG. 10 in respective operative trims.

With reference to FIGS. 1 to 9, herein illustrated is a machine 1 for mounting and/or removing tyred wheels for vehicles comprising a framework 2, means 3 for dragging a wheel in rotation around a first rotation axis x-x, which, in use, corresponds to the main symmetry or longitudinal axis of the wheel, the dragging means 3 having a portion 3a for coupling to the framework 2 as well as a portion 3b for working or engaging a rim W of a tyred wheel TW projecting from the coupling portion 3a in the direction of the front F of the machine and moving away from the rear R of the machine.

The rotation axis x-x is advantageously horizontal or inclined with respect to the horizontal by an angle between 5° and 40°, for example between 10° and 30°. The possible inclination of the rotation axis x-x is clearly such that the operative or engagement portion 3b extends starting from the coupling portion 3a upwards or that the free end/s of the operative or engagement portion 3b is/are at a higher level with respect to the respective end for connection to the coupling portion 3a.

The means 3 for dragging in rotation may for example comprise a group 3b with expandable jaws or grippers mounted on a tang 3a or the like inserted into or connected to the framework 2. Clearly, the means for dragging in rotation may also comprise a plate or board.

Possibly provided for are two, three, four or more jaws 3b1 or grippers, possibly with a substantially C-shaped end, the jaws or grippers 3b1 being articulated or pivoted to a main plate 3b2 and also provided for being means for actuating the jaws, such as a motor, possibly electric, pneumatic, hydraulic, designated to displace the jaws 3b1 between an inoperative position and a diverging or angular displacement position, wherein the jaws are moved apart with respect to a longitudinal symmetry axis actually corresponding to the rotation axis x-x of the means 3 for dragging in rotation or the free ends of the jaws 3b1 are moved apart thus each engaging a respective portion of the rim W, usually an edge of the rim W or a central part of the rim W, so that driving the dragging means 3 in rotation allows to drive the rim W and the tyre T thereon in rotation.

Furthermore, the dragging means 3 also comprise a suitable motor housed in the framework 2, possibly electric and provided with a special gearmotor, the motor being designed to drive the operative or engagement portion 3b in rotation and, possibly, the coupling portion 3a around the rotation axis x-x.

The dragging means 3 can also be slidably mounted along the framework 2, so as to be lifted and lowered, by means of a special motor for an adaptation as a function of the dimensions of a wheel to be handled or of the components thereof.

Clearly, the framework 2 may comprise one or more columns or uprights 2a rising from a base 2b and possibly displaceable on the latter.

The framework 2 or a column or upright 2a thereof can include a front part or wall 2c facing towards the front F of the machine and extending from which are dragging means 3, a rear part or wall 2d basically defining the rear R of the machine and two or more sides 2e, 2f for the bridge-connection of the front part 2c and of the rear part 2d. The framework 2 may then also comprise a top wall 2g as well as sections, uprights or crosspieces for supporting the various components of the machine.

Motors or means for driving components of the machine can be housed in the framework 2.

The front part or wall 2c may be inclined with respect to the horizontal, for example with lower end distant from the rear R relatively to the respective rear end.

Furthermore, the machine 1 defines a work area WZ substantially around the operative or engagement portion 3b of the dragging means 3 facing the front part or wall 2c, a tyred wheel TW being basically positioned and handled by the machine 1 in the work area WZ.

The machine 1 also comprises a first arm 4 extending from or supported by the framework 2 as well as at least one first mounting and/or removal tool 5, such as a roller, for example conical or frusto-conical, possibly rotatably mounted and, preferably idle, supported by the first arm 4, for example by a tubular element or cylindrical end 6 thereof.

If the first tool 5 is a roller rotatably mounted on an end of the first arm 4, then the rotation axis or second rotation axis of the roller w-w is preferably orthogonal or transversal and preferably but not necessarily incident with respect to the rotation axis x-x.

Furthermore, the first arm 4 can be displaced between at least one first receded or retracted inoperative position, wherein the first tool 5 is in a position closer to the rear R of the machine and farther than the front F of the machine, possibly beside the framework 2, and at least one second operative or removal or advanced or extended position (see FIGS. 5 and 6), wherein the first tool 5 is in a position advanced or next to or closer to front F of the machine 1 and farther from the rear R of the machine, so that the first tool 5 is designed to act or engage or push on a first side TW1 of a wheel mounted on the means 3 for dragging in rotation or better of a first circumferential bead T1 of a tyre mounted on a rim W in turn mounted on the means 3 for dragging in rotation closest to the coupling portion 3a with respect to a second side TW2 of the respective wheel TW or to a second circumferential bead T2 of a tyre.

Clearly, in the inoperative position, the first tool 5 is closer to the rear R and farther from the front F with respect to the second operative or removal position. In the inoperative position, the first tool 5 does not engage or it is not capable of engaging a first side TW1 of a wheel or a first circumferential bead T1 of a tyre T mounted on the means 3 for dragging in rotation.

The inoperative position could also be a position just before or next to the work area WZ.

Substantially, in the first position the tool 5 is outside or just outside the work area WZ, while in the second position or better in the second positions the tool 5 enters into the work area and pushes the tyre.

A plurality of second positions, i.e. several subsequent and adjacent positions of the arm 4 which define the consecutive thrust positions by the tool 5 on a tyre, are preferably provided for.

Furthermore, the arm 4 and thus the tool 5 are displaced or displaceable substantially parallel to the axis x-x when moving from the or a first to a second position and more in particular, when removing (thus not during the initial steps of adapting to the dimensions of the wheel to be handled and not necessarily in the steps of approaching a tool in the work area WZ) only along one direction as indicated now. Thus, the arm 4 and thus the tool 5 are not displaced or cannot be displaced along an arched or a circle arc direction when moving from a first or from the first to a second position or to the second positions.

To clarify further, a tyred wheel for a vehicle TW to be handled comprises a rim W and a tyre mounted on the latter, so as to have two sides TW1, TW2, each defined by a circumferential bead T1, T2 and by a respective annular edge W1, W2 of the rim W, with the two circumferential beads T1, T2 connected to each other by means of a lateral annular band T3 of the tyre T, while the two annular edges W1, W2 of the rim W are connected by means of the central body W3 of the rim.

Clearly, in the operative position or in the operative positions the tool 5 engages and pushes the tyre T of a wheel TW to be removed, in particular the first circumferential bead T1 which—in use—is internal, i.e. closer to the rear R with respect to the second circumferential bead T2, as explained better hereinafter while in the inoperative position the tool 5 does not engage the tyre T and in the receded position far from it and, preferably, outside the work area WZ.

Basically, when moving from a first or from the first to a second position, the first tool 5 advances in the direction of the front F of the machine and thus towards the external side TW2 of the wheel or better towards the outer edge W2 of the rim, i.e. the edge W2 far from the coupling portion 3a, pushing the tyre T at a respective first circumferential edge T1, which—in use—is more inner or closer to the rear R of the machine 1.

The first tool 5 is thus a rear tool, i.e. a tool that acts on the coupling side TW1 of a wheel TW or better on a respective first circumferential edge T1.

Preferably, the machine 1 also comprises a linear guide component 7 fixed or mounted on the framework 2, in particular on a side 2e thereof and having, at least for a final part of the extension thereof approaching the work area WZ, main or longitudinal extension axis y-y parallel or substantially parallel to the rotation axis x-x, and further comprising a slide-like component 8 slidably mounted on the linear guide component 7 as well as slidably fixed or constrained or integrally joined along an axis parallel to the axis x-x with the first arm 4. The slide-like component 8 could also represent a part of the first arm 4 and be or not be made of a single piece with the latter.

As observable hereinafter, the linear guide component 7 could also have a curved initial section and not with main or longitudinal extension axis y-y parallel or substantially parallel to the rotation axis x-x, wherein the expression initial section is used to indicate an end section distal from the means 3 for dragging in rotation or from the work area WZ of the machine.

Thanks to such expedient, the arm 4 and thus the tool 5 is displaced substantially parallel to the axis x-x when moving from a first or from the first to a second position.

Preferably, the machine 1 is provided with means 9 for displacing the slide-like component 8 and thus the first arm 4 between the first inoperative position and the second operative position, the displacement means including an electric or hydraulic or pneumatic displacement or sliding actuator 9 of the slide-like component 8 along the linear guide component 7 substantially along or in the direction of the main or longitudinal extension axis y-y.

The displacement or sliding actuator 9 is constrained or articulated or fixed, directly or with imposition of other components, on the one side to the framework 2 or to the column 2a and on the other side, directly or with interposition of other components, to the arm 4 or to the slide-like component 8.

According to the non-limiting embodiment illustrated in the figures, the linear guide component 7 comprises a plate 7a, possibly flat, for example rectangular-shaped, which can be fixed, possibly using screws or bolts or forced fitting of respective parts to the framework 2 or better to a side 2e thereof or of the column or upright 2a. The plate 7a has a main extension dimension along the main or longitudinal extension axis y-y.

Furthermore, the plate 7a may have an upper end 7b and/or lower end 7c substantially straight and extending parallel to the main or longitudinal extension axis y-y.

The plate 7a may be arranged at a desired height, for example in an intermediate position or also at the top part of the framework 2 or of the column or of the upright 2a. The machine 1 may also comprise means for lifting/lowering the plate 7a with respect to the framework 2.

The slide-like component 8 may instead include a section or extrusion or sheet 8a shaped so as to define an upper edge 8b curved or folded—in use—so as to define a first cradle-like portion for slidably wrapping or housing—or without clearance—the upper end 7b of the plate 7a and a lower, in use, edge 8c suitably curved or folded so as to define a second cradle-like portion for slidably wrapping or housing—with or without clearance—the lower end 7c of the plate 7a. Clearly, the first cradle-like portion and the second cradle-like portion are substantially aligned and open towards each other.

The first cradle-like portion and the second cradle-like portion have a substantially straight extension parallel to the main or longitudinal extension axis y-y.

The section or extrusion or shaped sheet 8a may then comprise an extension 8d defining an end section of the first cradle-like portion, but open towards the bottom and thus not delimiting a section of the second cradle-like portion.

Naturally, there could also be a different structure, for example with a flat plate or structurally corresponding to the plate 7a representing the slide-like component, and with a section or extrusion or shaped sheet structurally corresponding to the section or extrusion or shaped sheet 8a representing the linear guide component.

On the other hand, as concerns the displacement or sliding actuator 9, it can for example include a cylinder 9a with a stem 9b slidably mounted thereon, in which case the cylinder 9a could be fixed or connected to the framework 2, while the stem 9b could be fixed or connected to the slide-like component 8 or vice versa.

For example with reference to the non-limiting embodiment illustrated in the figures, the cylinder 9a is clamped between two blocks 17, possibly C-shaped, one of which is fixed to the framework 2, possibly by means of screws, welding, gluing or other means, the blocks 17 being mutually constrained and clamped, after positioning the cylinder 9a between them, by means of screws or bolts or other means 18.

On the other hand, the stem 9b is inserted and fixed into an appendage 8e which extends from an end of the extension 8d.

Clearly, the machine 1 may also comprise stop means for limiting the sliding or displacement extension of the slide-like component 8 on the linear guide component 7.

A different structure, for example a telescopic arm mounted or fixed to the framework, thus without the linear guide component and slide-like component, could also be provided for.

Advantageously, the first arm 4 may also be pivoted or mounted angularly displaceable around a pivoting axis z-z with respect to the framework 2 or to the column or upright 2a or to the slide-like component 8, the pivoting axis z-z preferably being substantially orthogonal to the rotation axis x-x or to an axis parallel thereto and, even more preferably, to a first plane lying on which is the rotation axis x-x and a horizontal axis intercepting the horizontal axis x-x and parallel to the direction from one side 2e to the other 2f of the machine 1 or of the framework 2.

Such angular displacement serves to adapt the arrangement of the tool 5 as a function of the diameter of a wheel TW or better of the rim W of a wheel to be handled.

The pivoting of the first arm 4 can for example be obtained by inserting a first pin 15 into one or more holes delimited by the framework 2 or by the slide-like component 8 as well as in a first through hole delimited by the first arm 4 possibly at a rear end 4a or on the rear thereof possibly having an end enlargement. As concerns this, the rear end 4a could also be arranged and pivoted with the pin 15 between two bracket-like components 8f of the slide-like component 8.

The first arm 4 can be pivoted or angularly displaceable between at least one closing position (see FIG. 3), wherein the arm 4 or better the tool 5 is next to or proximal to the framework 2 or to the respective side 2e and at least one opening position (see FIG. 4) wherein the arm 4 or better the tool 5 is far or distal or more distant with respect to the closing position from the framework 2 or from the respective side 2e. Between the closing position and the opening position the arm 4 could carry out an angular excursion for example between about 1° and about 45°, possibly between 5° and 30° or between 5° and 20°.

Thanks to the solution according to which the first arm 4 is pivoted around a pivoting axis z-z substantially orthogonal to the rotation axis x-x or to an axis parallel thereto as well as to the first plane indicated above, i.e. a first plane lying on which is the rotation axis x-x and a horizontal axis intercepting the rotation axis x-x and parallel to the direction from one side 2e to the other 2f of the machine 1, the length dimension of the first arm 4 preferably always lies in such first plane or in a plane parallel thereto, even following the pivoting around the axis z-z.

Advantageously, if the first tool 5 is a roller rotatably mounted on an end of the first arm 4, then the rotation axis or second rotation axis of the roller w-w preferably always lies in the same plane, possibly passing through the rotation axis x-x or through an axis parallel thereto. Still with reference to the first plane, lying on which is the rotation axis x-x and a horizontal axis intercepting the rotation axis x-x and parallel to the direction from one side 2e to the other 2f of the machine, the second rotation axis of the roller w-w preferably always lies in such plane or in a plane parallel thereto, even following the pivoting around the axis z-z.

In such case, the first arm 4 may be pivoted to the slide-like component 8 at a portion distal from the coupling portion 3a or at the rear R. Thus, for example, given that the slide-like component 8 and the first arm 4 are in the first receded inoperative position, the pivoting axis z-z is distant from the coupling portion 3a by a value for example greater than 20, 30, 40 or 50 cm. This guarantees that the angular displacement of the arm for adapting to wheels of different dimensions is small.

The machine 1 may then comprise angular displacement means 19 designed to angularly displace—around the axis z-z—the first arm 4 with respect to the framework 2, for example with respect to the slide-like component 8. Alternatively, the first arm 4 can be displaced manually and thus fixed in position using a special stop element.

The angular displacement means 19 can for example be of the manual or automatic actuation type.

According to the embodiment illustrated in the figures, the angular displacement means 19 comprise a flywheel 20 for controlling and driving in rotation a shaft 21, fixed, integrally joined with or actuatable using the flywheel 20, the shaft 21 possibly being externally threaded for the screwing engagement with an internally threaded hole delimited by the first arm 4 or by a bushing or sleeve 22 constrained to the first arm 4, possibly supported, preferably displaced angularly or pivoted, by one or more pairs of brackets 23 fixed or welded to the arm 4. The shaft 21 in this case can also traverse a slot or hole delimited in the arm 4 and aligned to the internally threaded through hole delimited by the bushing or sleeve 22.

A second pin or pawl 24 can be provided for pivoted or fixed to the slide-like component 8 and delimiting a hole for the through-passing of an end of the shaft 21.

The shaft 21 could also have an end that is internal or far from the flywheel 20, which—in an end position—is at contact and pressure against an inner face of the slide-like component 8.

With a structure thus made, controlling the rotation of the flywheel 20 manually would determine the screwing or unscrewing of the shaft 21 with respect to the bushing 22 and thus the angular displacement of the arm 4 fixed to the latter with respect to the slide-like component 8.

As mentioned above, a different structure could also be provided for, possibly with direct pivoting of the arm to the framework 2 or to the column 2a.

Clearly, the adaptation of the first arm 4 and thus of the tool 5 as a function of the diameter of a wheel TW or better of the rim W of a wheel to be handled, can also be obtained in a different fashion, possibly even mounting the displaceable arm along a second guide orthogonal to the axis y-y, possibly also providing the machine with means for the translation of the arm along such second guide.

Furthermore, the first arm 4 may comprise a first segment 4b at least partially tubular as well as a second segment 4c slidably mounted in the first segment 4b or in the tubular part of the first segment 4b, the second segment 4c bearing—at a respective end distal from the first segment 4b—the first tool 5, possibly by interposing a tubular element or cylindrical end 6 thereof. In such case, the machine 1 also comprises means 12 for fixing—in two or more work positions of the second segment 4c—to the first segment 4b, the second segment 4c projecting from the first segment 4b by a respective value different from the other positions, in each operative position.

Regarding this, according to the non-limiting embodiment illustrated in the figures, the first tubular segment 4b delimits a first through hole 4d, while the second tubular segment 4c delimits two or more second through holes 4e, hence aligning the first through hole 4d with a respective second through hole 4e allows to obtain an operative position of the second segment 4c which can be clearly stabilised or defined by inserting a bolt or rod or the like 12 in the holes thus aligned.

The first tubular segment 4b may have a straight extension or even several inclined parts. Same case applies to the second tubular segment 4c.

The rear end 4a of the arm 4 may be defined by the first tubular segment 4b.

The first arm 4 may also support a roller or thrust tool 25, possibly next to the first tool 5 and in position on the side opposite to the means 3 for dragging in rotation with respect to the first tool 5.

More in particular, if the first tool 5 comprises a roller, then the thrust roller 25 may have a rotation axis substantially corresponding to that of the first tool 5. In such case, the first tool 5 would extend starting from an end of the first arm 4 or of a respective tubular element or cylindrical end 6 approaching the dragging means 3, while the thrust roller 25 would extend starting from an end of the first arm 4 or of a respective end tubular or cylindrical element 6 moving apart from the dragging means 3 and in the direction opposite to the first tool 5.

Possibly, the machine 1 comprises at least one second arm 26, possibly L-shaped or straight or with several pieces inclined with respect to each other, extending from the framework 2 or from the column 2a, for example from a second side 2f of the framework or of the column 2a opposite to the first side 2e from which the first arm 4 projects. The second arm 26 may also extend starting from the top wall 2g of the framework 2 or column 2a or of a respective second side 2f.

The machine 1 also includes at least one second mounting and/or removal and/or beading tool 27 supported by the second arm 13.

The second tool 27 could comprise a conical or frusto-conical roller, possibly mounted rotatable and, preferably idle, on the second arm 26.

In such case, the second arm 26 is displaceable between at least one first inoperative trim, wherein the second tool 27 is in a position that is more distant from the rear R of the machine 1 as well as from the work area WZ and at least one second operative or engagement or beading or thrust trim, wherein the second tool 27 is in a position that is closer to the rear R of the machine 1 and it is arranged in the work area WZ, so that the second tool 27 is designed to act on a second side TW2 of a wheel TW or better on a second circumferential bead T2 of a tyre T mounted on means 3 for dragging in rotation farther from the coupling portion 3a with respect to a first side TW1 of the respective wheel TW or to a first circumferential bead T1 of a tyre, so that the second tool 27 is designed to act on a second side TW2 of a wheel opposite to a first work side TW1 of the first tool 5.

Clearly, in the inoperative trim the second tool 5 is farther from the rear R with respect to the operative trim.

Basically, when moving from the first to the second trim, the second tool 27 advances in the direction of the rear R and of the work area WZ of the machine and thus towards the inner side TW1 of the wheel, i.e. the side TW1 close to or next to the coupling portion 3a.

As concerns the displacement of the second arm 26 between the first and the second trim, actuation means 28, such as an electric, hydraulic or pneumatic actuator, may be provided for.

In such case, the second arm 26 could be pivoted to the framework 2 or to the column 2a around an angular displacement axis. The angular displacement axis may be or may be not incident with the rotation axis x-x, and it could also be varied as a function of the adaptation of the second arm 26 to the dimensions of the wheel.

The second tool 27 is thus a front tool, i.e. a tool that acts on the outermost or free side TW2 of a wheel TW mounted on the machine or on a respective second circumferential bead T2 or between a second circumferential bead T2 and a second edge W2.

Possibly, the second arm 26 can be displaced so as to adapt it to the dimensions of the wheel T and of the rim W of a wheel TW to be handled and also so as to allow to free the area facing the dragging means 3, i.e. the work area WZ, for the loading or the unloading—thereonto/therefrom—of a wheel TW to be removed or of a wheel W on which a tyre T is to be mounted. As regards this, the second arm 26 could be pivoted to the column 2a around an axis for example substantially parallel to the rotation axis x-x of the means 3 for dragging in rotation. In such case, the machine could comprise actuator means 29, such as an electric, hydraulic or pneumatic actuator, for controlling the angular displacement of the second arm 26 as indicated now.

As regards the second arm 26 and the second tool 27, they could for example be as disclosed by U.S. Pat. No. 6,422, 285B1.

Clearly, the second arm 26 could also be obtained or displaced even in a different fashion and even possibly with a guide system and slider similar to the first arm 4.

The machine 1 may also comprise other tools, for example a mounting nail 33 or the like supported by a respective third arm 34 and manually actuatable or suitably actuated by means of respective actuator/s.

A machine according to the present invention also comprises control means 32, for example buttons or pedals each designed to control the actuators or motors of the machine.

Clearly, a remote control for the actuation means, actuators or other means of the machine, for example by means of a remote control, computer, tablet, mobile phone etcetera, could also be provided for.

The machine could also comprise a programmed control unit for automatically controlling the means of the machine and possibly receive and process signals of respective detection means or sensors.

As regards this, the machine 1 could also be provided with sensor means designed to detect the rim W and/or the tyre T and send—directly or by means of a programmed control unit—respective signals to the actuation means so as to determine the displacement or advancement of the arms between respective positions or trim.

Now, with reference to FIGS. 10 to 20 herein illustrated is a machine according to the present invention similar to the machine described above, but wherein the first arm 40 and the slide-like component 80 are structured differently or better the constraint between them is structured differently.

As regards this, the first arm 40 and the slide-like component 80 are articulated or connected to each other by means of an articulated polygon structure or an articulated parallelogram.

Figure 13:
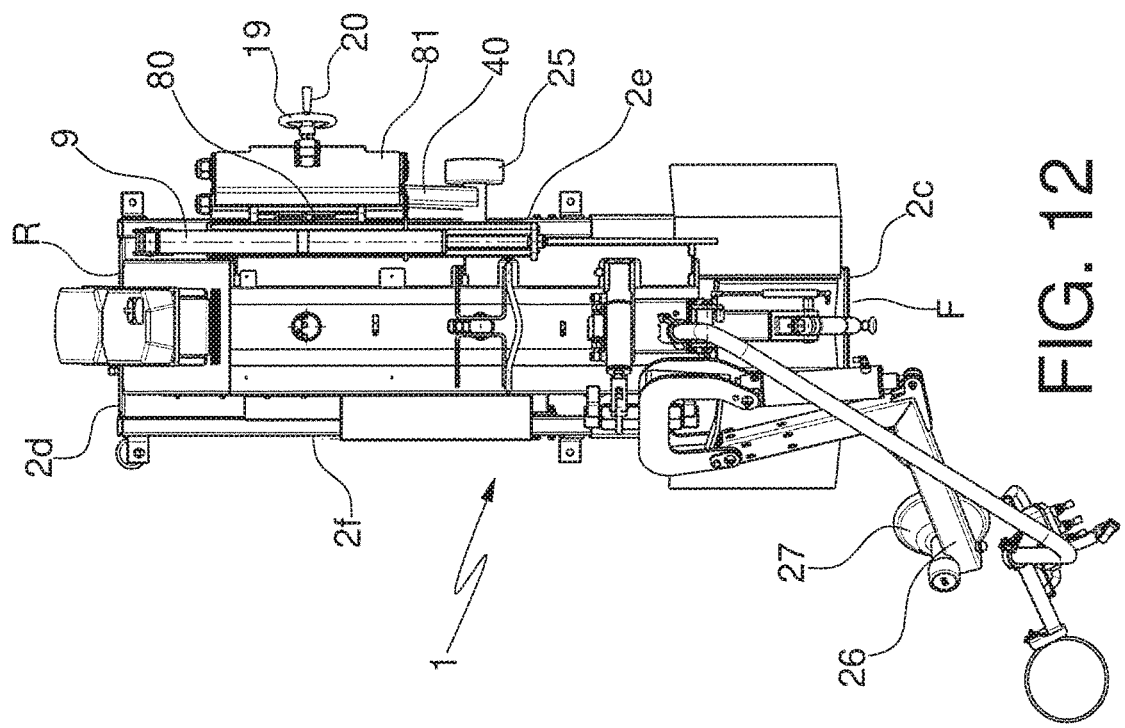
Figure 17:
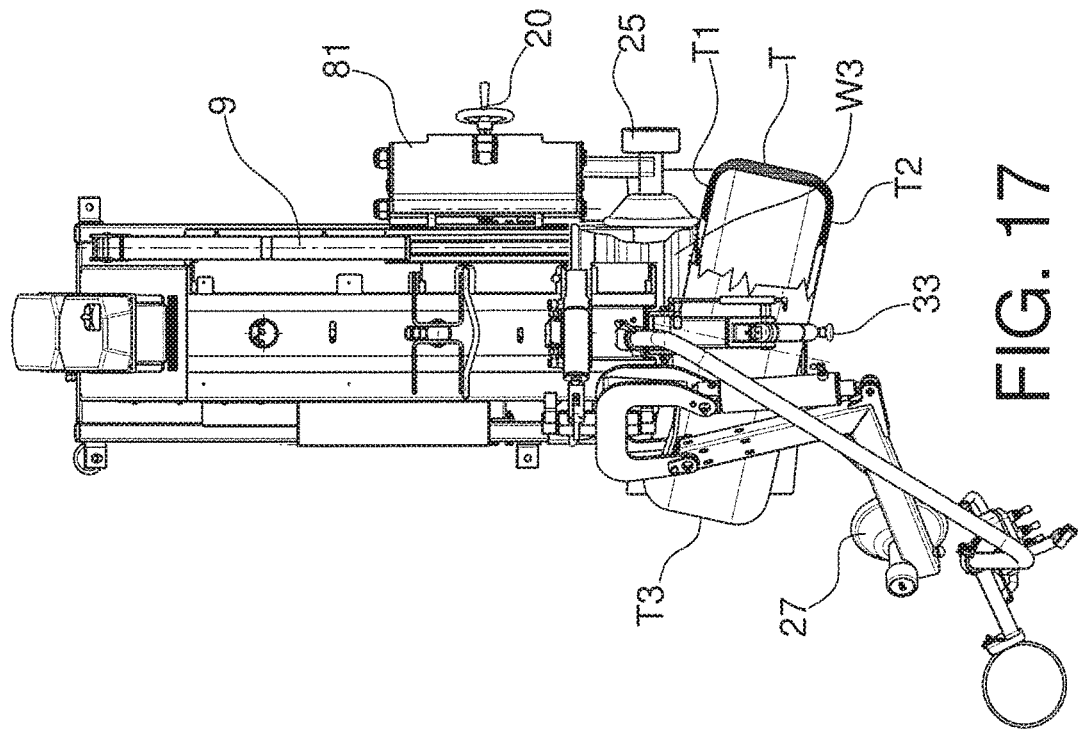
FIGS. 16 and 17 are top views of the machine of FIG. 10 in respective removal steps.
Figure 16:
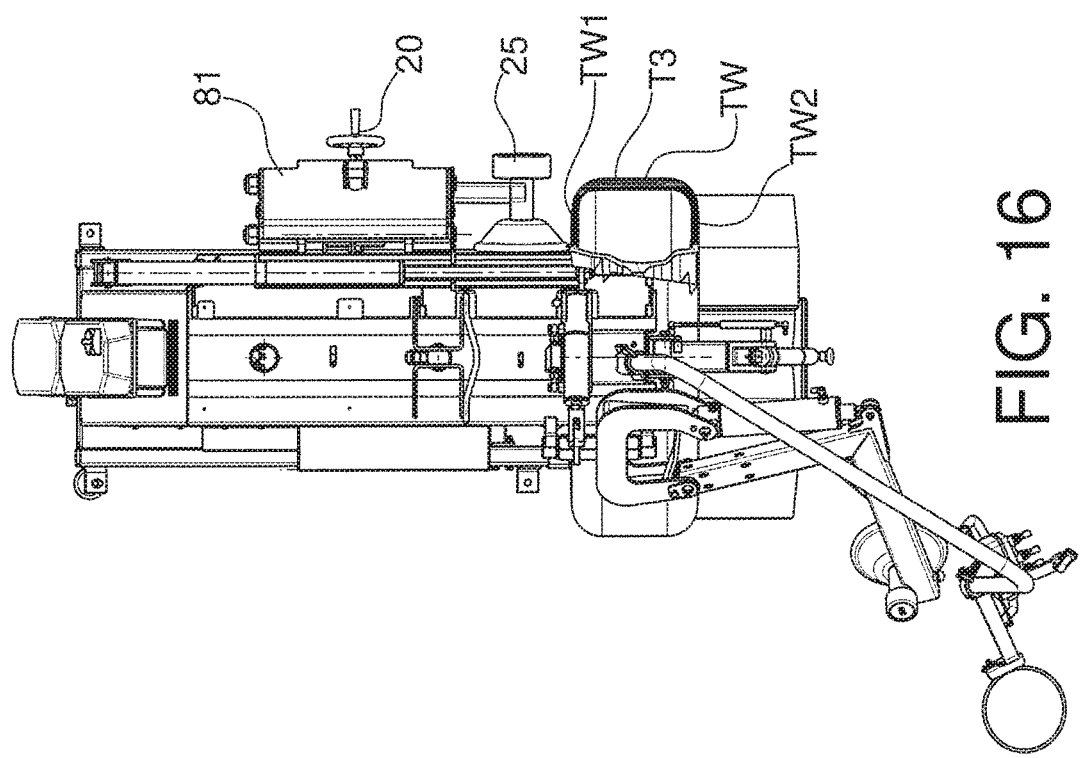
Figure 20:
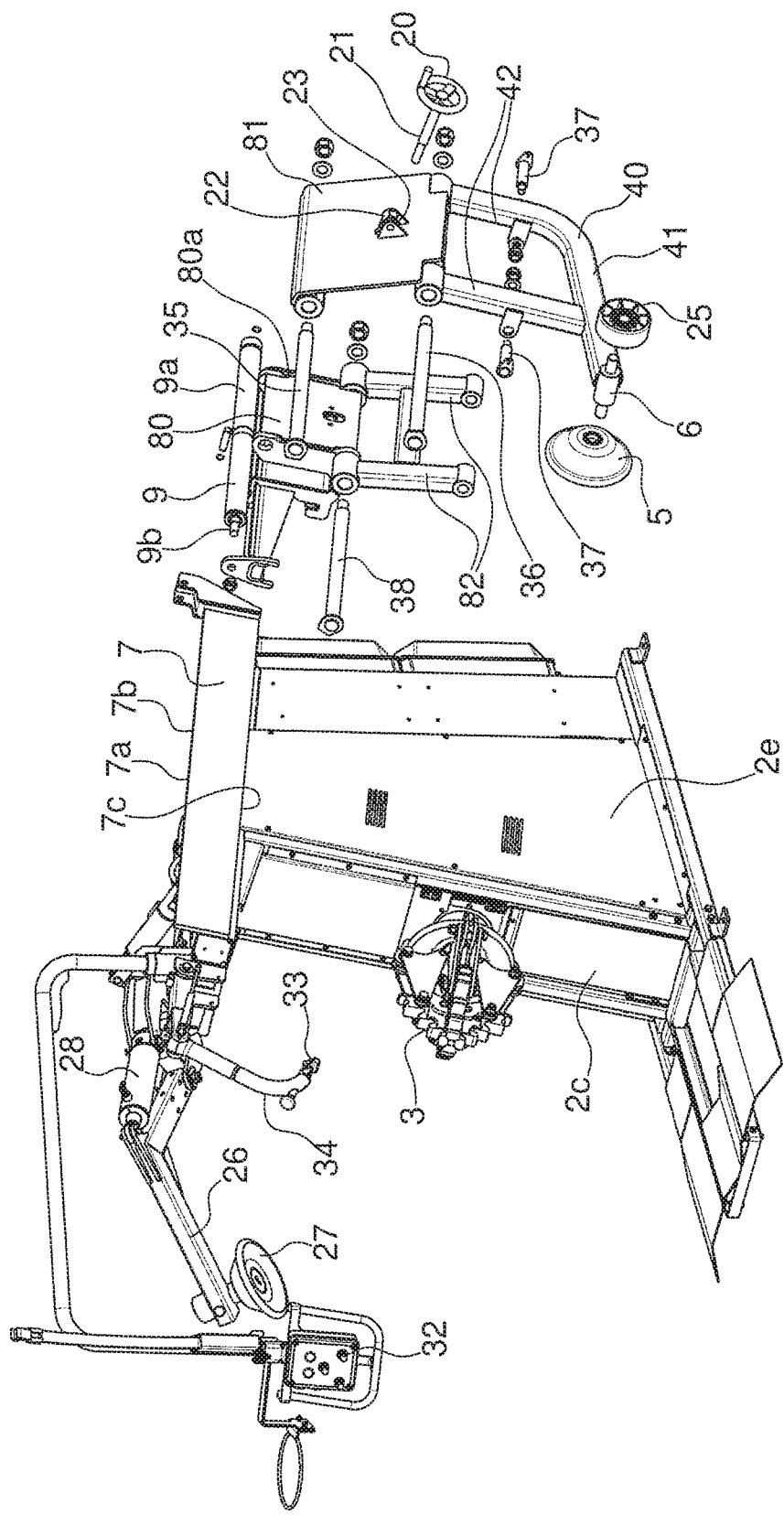
FIG. 20 is a view with parts of the machine of FIG. 10 in exploded view.

In such case, the articulation axes of the articulated parallelogram and thus the respective pins 35, 36, 37 and 38 are preferably substantially parallel to the rotation axis x-x (in particular see FIGS. 13 and 14).

Furthermore, in such case, the first arm 40 and the slide-like component 80 would represent two branches or opposite pieces of the articulated parallelogram.

With reference to such aspect, according to the example illustrated in the figures, the slide-like component 80 comprises a section or extruded component or shaped sheet 80a similar to the one described above, and two arms or connection plates which are articulated or pivoted, preferably between axes substantially parallel to the rotation axis x-x, on the one side to the section or extruded component or shaped sheet 80a and—on the other side to the first arm 40, are provided for.

More in particular, at an upper end of the section or extruded component or shaped sheet 80a a board or first connection element 81 is pivoted at a respective first side, while one or a pair of second connection or tubular elements 82 are pivoted at a lower end of the section or extruded component or shaped sheet 80a.

The board 81 is also pivoted at a second side opposite to the first arm 40 and the same case applies to the second connection element/s 82.

Clearly, if several second connection or tubular elements 82 are provided for, the latter will preferably have the same length and each will be pivoted around the pivoting axis of the others.

In such case, the first arm 40 may have a first segment 41 and one or a pair of second segments 42 connecting the first segment 41 and a respective point for pivoting to the board 81, while each of the connection or tubular elements 82 are pivoted at an intermediate section of a respective first 41 or second 42 segment.

In such case, the bushing or sleeve 22 may be supported, preferably angularly displaceable or pivoted, by one or a pair of brackets 23 fixed or welded to the board 81.

As it will be understood, controlling the rotation of the flywheel 20 manually would in such case determine the screwing or unscrewing of the shaft 21 with respect to the bushing 22 and thus the angular displacement of the arm 40 fixed to the latter with respect to the slide-like component 80, according to the displacements imparted by the articulated parallelogram.

Such structuring would allow to easily maintain the rotation axis or second rotation axis w-w of the roller incident and radial with respect to the rotation axis x-x or in a position proximal to such condition, this entailing an optimal operation of the wheel.

Furthermore, even according to the embodiment described now, the arm 40 and thus the tool 5 is displaced parallel to the axis x-x when moving from a first or from the first to a second position.

The machine according to the present invention, for example according to the embodiments described above, allows to implement the following removal method.

First, the wheel to be removed is mounted and locked on the dragging means 3, for example an expandable jaw unit 3*b* and then the first tool 5 is brought with the work front or end facing towards the circumferential area of the tyred wheel TW for contact between the tyre T and the rim W.

The expression work front or end is used to indicate the portion which, in use, and if the roller is rotatable, whenever required and during the rotation of the roller 5, is at contact with a portion of the bead of the tyre.

If necessary and if possible, before such step, the first arm 4, 40 is displaced angularly possibly using angular displacement means 19 so as to adapt the tool 5 as a function of diameter of a wheel TW or better of the rim W of a wheel to be handled.

The motor of the means 3 for dragging in rotation is then actuated and then the displacement of the first arm 4, 40 is controlled, possibly using displacement means 9, between a first receded inoperative position (see FIGS. 5 and 16), and at least one second operative or removal position (see FIGS. 6 and 17), along a direction substantially parallel to the rotation axis x-x, so that the first tool 5 is brought into contact and thrust on a portion of a first side TW1 of a wheel mounted on means 3 for dragging in rotation or better of a first circumferential bead T1 of a tyre mounted on a rim W in turn mounted on means 3 for dragging in rotation.

Prior to such step or even at the beginning of such step, the second tool 27, if present, can also be brought in operative position against the second side TW2 of the wheel or better against the second circumferential bead T2 of the tyre T at the second side TW2, so that, while the means 3 for dragging in rotation are activated, the second tool 27 contributes to bead-breaking the second circumferential bead T2, i.e. to detach the second circumferential bead T2 from the second edge. As regards this, the second tool 27 will preferably act on a portion of the wheel angularly or diametrically opposite to that of action of the first tool 5.

Thus, maintaining the actuation of the dragging means 3 or controlling the actuation thereof now or re-activating them now (for example following the bead-breaking step), in particular after retracting or displacing the second tool 27, if present, it is continued the control of the advancement or displacement of the first arm 4, 40 along a direction parallel to the axis x-x, so that the first tool 5 pushes or continues to push the tyre T so as to bring it with both circumferential beads T1, T2 thereof beyond the rim W or better outside the groove C defined between the circumferential edges W1, W2 thereof, then an operator, in particular after stopping the dragging means 3 and the advancement of the first arm 4, can pick up the tyre T to complete the removal thereof and possibly mounting a new tyre on the rim W mounted on the dragging means 3.

Clearly, when removing the operator can intervene with special levers or manual tools.

Operating tools such as in particular the second tool 27 and the mounting tool 33 or possible levers used by an operator according to the known execution methods, for example as described in U.S. Pat. No. 6,422,285B1, can be used for mounting a tyre on a rim.

As it will be observed, using a machine according to the present invention, given that the linear guide component 7 has a main or longitudinal extension axis y-y parallel or substantially parallel to the rotation axis x-x, the arm 4 and thus the tool 5 is displaced during removal parallel to the axis x-x when moving from a first or from the first to a second position.

Furthermore, if the first tool 5 is a rotatable roller, when moving from a first or from the first to a second position, the rotation axis or second rotation axis of the roller w-w preferably always lies in the same plane lying on which is the rotation axis x-x and a horizontal axis intercepting the rotation axis x-x and parallel to the direction from one side 2*e* to the other 2*f* of the machine or in a plane parallel to such plane.

This, according to the embodiment of FIGS. 1 to 9, is also preferably guaranteed in cases where the first arm is angularly displaceable with respect to the framework 2 or the column 2*a*.

On the other hand, in case of the machine according to FIGS. 10 to 20, it is possible to maintain the rotation axis or second rotation axis of the roller w-w incident and radial relatively to the rotation axis x-x or in a position proximal to such condition, even following the adaptation of the first arm 40 as a function of the dimensions of the wheel or better of the rim to be handled, further reducing the risk of ruining the first arm or the articulation thereof and thus obtaining optimal operating conditions of a wheel (in particular removal).

Thanks to the solutions described above, as it will be observed, the arm 4 is stressed appropriately and there is no risk of it being ruined during the operations, this not being the case in machines according to the prior art, wherein the rear roller is displaced along a circle arc thus not complying with any of the conditions described now.

Modifications and variants of the invention can be implemented within the scope of protection defined by the claims.

The invention claimed is:

1. A machine for mounting and/or removing tyred wheels for vehicles comprising a framework, means for dragging a wheel in rotation around a first rotation axis, said dragging means having a portion for coupling to said framework as well as a portion for working or engaging a rim of a tyred wheel which projects from said coupling portion in the direction of the front of the machine and moving away from the rear of the machine, said machine further comprising at least one first arm extending from or supported by said framework and at least one first mounting and/or removal tool supported by said at least one first arm, said at least one first arm being displaceable between at least one first receded or retracted inoperative position, wherein said at least one first tool is in a position closer to the rear of the machine and farther from the front of the machine and at least one second operative position, wherein said at least one first tool is in an advanced position proximal or next to or closer to said front of said machine and farther from said rear of the machine, so that said at least one first tool is designed to act or engage or push on a first side of a wheel or better on a first circumferential bead of a tyre mounted on the means for dragging in rotation which is closer to the coupling portion with respect to a second side of the respective wheel or to a second circumferential bead of a tyre, wherein said first arm and thus said at least one first tool are displaceable between said at least one first inoperative position and said at least one second operative position substantially parallel to the rotation axis when moving from said at least one first to said at least one second position.

2. The machine according to claim 1, comprising a linear guide component fixed or mounted on said framework and having, at least as regards a part of the extension thereof approaching the work area of the machine, main or longitudinal extension axis parallel or substantially parallel to said rotation axis, and it further comprises a slide-like component slidably mounted on said linear guide component as well as slidably fixed or constrained or integral with said at least one first arm.

3. The machine according to claim 2, comprising means for displacing said slide-like component and thus said at least one first arm between said at least one first inoperative position and said at least one second operative position, said displacement means including a displacement or sliding actuator of said slide-like component along said linear guide component substantially along or in the direction of said main or longitudinal extension axis.

4. The machine according to claim 2, wherein said at least one first arm is pivoted or mounted angularly displaceable around a pivoting axis with respect to the framework and wherein said at least one first arm is pivoted to the slide-like component at a portion distal from the coupling portion or still at the rear of the machine.

5. The machine according to claim 4, wherein when the slide-like component and the first arm are in the first receded inoperative position, the pivoting axis is distant from the coupling portion by a value greater than 20, 30, 40 or 50 cm.

6. The machine according to claim 2, wherein the first arm and the slide-like component are pivoted and connected to each other by means of an articulated polygon-shaped or articulated parallelogram-like structure.

7. The machine according to claim 6, wherein the pivoting axes of the articulated parallelogram and thus respective pins are substantially parallel to said first rotation axis.

8. The machine according to claim 1, wherein said at least one first arm is pivoted or mounted angularly displaceable around a pivoting axis with respect to the framework.

9. The machine according to claim 8, wherein said pivoting axis is substantially orthogonal to said first rotation axis or to an axis parallel thereto.

10. The machine according to claim 9, wherein said pivoting axis is substantially orthogonal to a first plane in which lie the rotation axis and a horizontal axis intercepting the rotation axis and parallel to the direction from one side to the other of the machine or the framework, so that the length dimension of the first arm always lies in such first plane or in a plane parallel thereto, also following the pivoting of the first arm around the pivoting axis.

11. The machine according to claim 8, comprising angular displacement means arranged to angularly displace the first arm with respect to the framework around the pivoting axis.

12. The machine according to claim 11, wherein said angular displacement means comprise a flywheel for controlling and driving in rotation a shaft threaded externally for the screwing engagement with an internally threaded hole delimited by the first arm or by a bushing or sleeve constrained to the first arm.

13. The machine according to claim 1, wherein said at least one first arm comprises an at least partly tubular first segment, as well as a second segment slidably mounted in the tubular part of the first segment, the second segment bearing the first tool at a respective end distal from the first segment and wherein said machine comprises means for fixing, in two or more operative positions, the second segment to the first segment, in each operative position the second segment projecting from the first segment by a respective amount different from the other operative positions.

14. The machine according to claim 1, wherein said first tool is a conical or frusto-conical roller rotatably mounted on an end of said first arm around a second rotation axis.

15. The machine according to claim 14, wherein said second rotation axis lies in a first plane in which lie said first rotation axis and a horizontal axis intercepting said first rotation axis and parallel to the direction from one side to the other of the machine or in a plane parallel to such first plane.

16. The machine according to claim 1, comprising at least one second arm extending from said framework as well as at least one second mounting and/or removal and/or bead-breaking tool supported by said at least one second arm, said second arm being displaceable between at least one first inoperative trim, wherein said at least one second tool is in a position more distant from the rear and at least one second working or engagement or bead-breaking or thrust trim, wherein the second tool is in a position closer to the rear of the machine, so that said at least one second tool is arranged to act on a second side of a wheel or better on a second circumferential bead of a tyre mounted on the means for dragging in rotation farther from the coupling portion with respect to a first side of the respective wheel or to a first circumferential bead of a tyre, so that the second tool is arranged to act on a second side of a wheel opposite to a first working side of the first tool.

17. A method for removing a tyred wheel comprising the following steps, arranging a machine for mounting and/or removing tyred wheels for vehicles comprising a framework, means for dragging a wheel in rotation around a first rotation axis, said dragging means having a portion for coupling to said framework as well as a portion for working or engaging a rim of a tyred wheel which projects from said coupling portion in the direction of the front of the machine and moving away from the rear of the machine, said machine further comprising at least one first arm extending from or supported by said framework and at least one first mounting and/or removal tool supported by said at least one first arm, said at least one first arm being displaceable between at least one first receded or retracted inoperative position, wherein said at least one first tool is in a position closer to the rear of the machine and farther from the front of the machine and at least one second operative position, wherein said at least one first tool is in an advanced position proximal or next to or closer to said front of said machine and farther from said rear of the machine, so that said at least one first tool is designed to act or engage or push on a first side of a wheel or better on a first circumferential bead of a tyre mounted on the means for dragging in rotation which is closer to the coupling portion with respect to a second side of the respective wheel or to a second circumferential bead of a tyre, wherein said first arm and thus said at least one first tool are displaceable between said at least one first inoperative position and said at least one second operative position substantially parallel to the rotation axis when moving from said at least one first to said at least one second position;

mounting and locking the wheel to be disassembled on the dragging means, bringing the first tool with work front or end facing towards the circumferential area of the tyred wheel for contact between the tyre and the rim, commanding or controlling the displacement of the first arm between a first receded inoperative position and a second operative or removal position along a direction substantially parallel to said first rotation axis, so that the first tool is brought into contact and thrust on a portion of a first side of a wheel or better of a first circumferential bead of a tyre mounted on the means for dragging in rotation, actuating the means for dragging in rotation or keeping them actuated so as to drag the tyred wheel in rotation and continue to control the advancement or displacement of the first arm so that the first tool pushes the tyre so as to carry it with both of its circumferential beads beyond the rim or better outside the groove defined between the circumferential edges, and picking up the tyre.

18. The method according to claim 17, wherein said machine comprises at least one second arm extending from said framework as well as at least one second mounting and/or removal and/or bead-breaking tool supported by said at least one second arm, said second arm being displaceable between at least one first inoperative trim, wherein said at least one second tool is in a position more distant from the rear and at least one second working or engagement or bead-breaking or thrust trim, wherein the second tool is in a position closer to the rear of the machine, so that said at least one second tool is arranged to act on a second side of a wheel or better on a second circumferential bead of a tyre mounted on the means for dragging in rotation farther from the coupling portion with respect to a first side of the respective wheel or to a first circumferential bead of a tyre, so that the second tool is arranged to act on a second side of a wheel opposite to a first working side of the first tool, the method comprising:

carrying said second tool in an operative position against the second side of the wheel or better against the second circumferential bead of the tyre at the second side, so that, while the means for dragging in rotation are activated, the second tool contributes to break the beads of the second circumferential bead, i.e. detach the second circumferential bead from the second edge.

* * * * *